(No Model.) 2 Sheets—Sheet 1.
S. VAN SLYKE.
FIFTH WHEEL.
No. 501,549. Patented July 18, 1893.
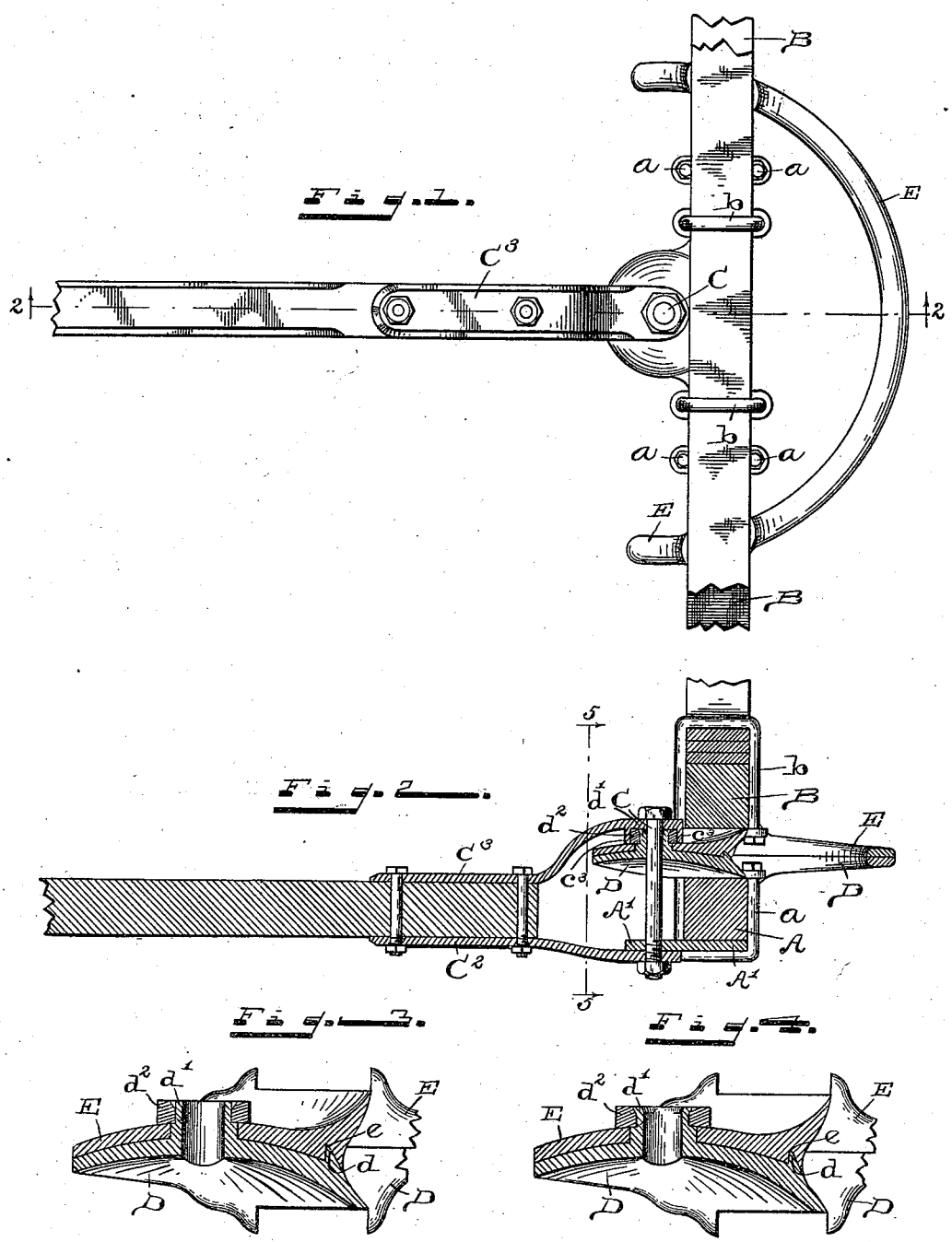
WITNESSES:
F. W. Warner.
J. A. Walsh.
INVENTOR
Stephen Van Slyke,
per Chester T. Bradford,
ATTORNEY.

(No Model.) 2 Sheets—Sheet 2.
S. VAN SLYKE.
FIFTH WHEEL.
No. 501,549. Patented July 18, 1893.
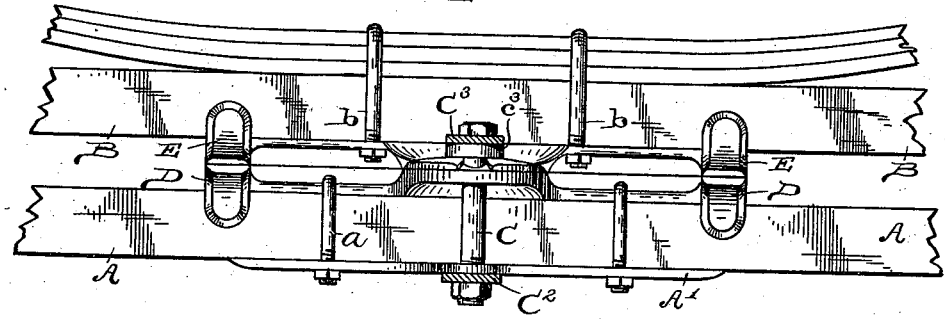
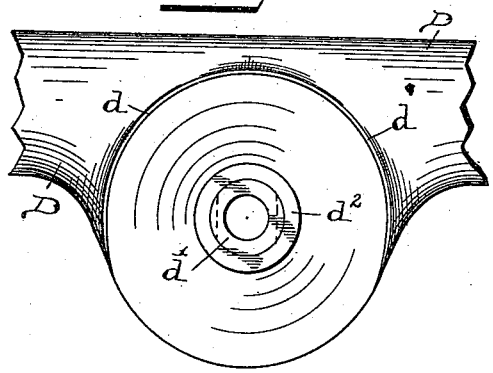 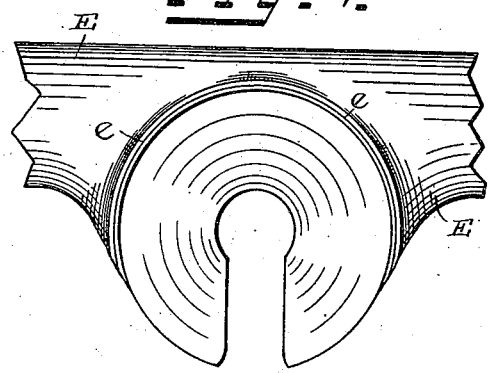
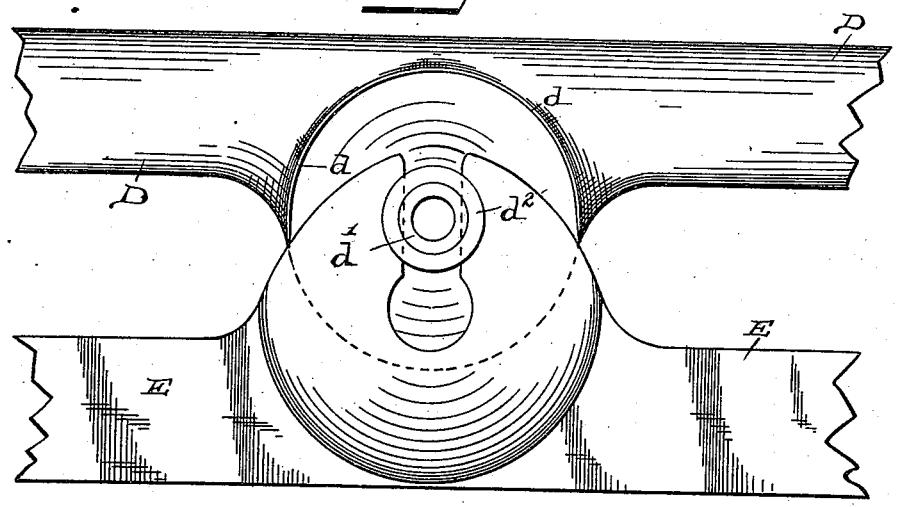
WITNESSES:
T. W. Warner
J. A. Walsh
INVENTOR
Stephen Van Slyke.
per Chester Bradford,
ATTORNEY.

UNITED STATES PATENT OFFICE.

STEPHEN VAN SLYKE, OF INDIANAPOLIS, INDIANA, ASSIGNOR OF ONE-HALF TO SAMUEL PAUGH, OF SAME PLACE.

FIFTH-WHEEL.

SPECIFICATION forming part of Letters Patent No. 501,549, dated July 18, 1893.

Application filed August 23, 1892. Serial No. 443,923. (No model.)

*To all whom it may concern:*

Be it known that I, STEPHEN VAN SLYKE, a citizen of the United States, residing at Indianapolis, in the county of Marion and State of Indiana, have invented certain new and useful Improvements in Fifth-Wheels, of which the following is a specification.

The object of my said invention is to produce a simple, durable and efficient fifth wheel for vehicles, the parts of which shall be securely locked together when assembled, and which shall have large bearing and wearing surfaces, and also in which various other advantages shall be secured.

It consists in a certain construction and arrangement of parts, and in various details of construction, as will be hereinafter more particularly described and claimed.

Referring to the accompanying drawings, which are made a part hereof, and on which similar letters of reference indicate similar parts, Figure 1 is a top or plan view of fragments of a bolster, an axle, and a reach, with my improved fifth wheel attached thereto; Fig. 2, a central sectional view of the same on the dotted line 2 2 in Fig. 1; Fig 3, a detail sectional view similar to a portion of Fig. 2, on an enlarged scale, showing the parts finished but not fully fastened together; Fig. 4, a similar view with the fastening operation completed; Fig. 5, a view looking to the left from the dotted line 5 5 in Fig. 2, showing the rear side of the fifth wheel in elevation; Fig. 6, a detail top plan of the bearing portion of the lower half of the fifth wheel; Fig. 7, an under side plan view of the bearing portion of the upper half, and Fig. 8, a top or plan view of the two parts in the act of being put together.

In said drawings the portions marked A represent a fragment of the axle of the vehicle; B a fragment of the bolster; C a fragment of the reach or coupling pole; D the lower half of the fifth wheel, and E the upper half.

The axle A, bolster B, reach C and their attachments are or may be of any desired form or construction.

The fifth wheel consists of the two parts D and E which are attached to the axle and bolster, repectively, by means of clips or bolts $a$ and $b$. As will be seen by an inspection of the drawings, particularly Figs. 1 and 2, this fifth wheel is of that variety where the pivot bolt is to the rear of the axle. It is connected by means of a pivot bolt $C'$ with the reach irons $C^2$ and $C^3$. Said bolt $C'$ also extends down through a hole in a projecting ear $a'$ on an axle plate $A'$ secured to the under side of the axle, preferably by means of the same clips or bolts by which the lower half of the fifth wheel is secured thereto. The distance between the points where this bolt passes through the fifth wheel and through the hole on this axle plate is great enough so that there is no possibility of any rocking or tipping of the axle relatively to the reach and the remainder of the vehicle structure. The reach iron $C^3$ is formed with a cup-shaped front end $c^3$ which fits down over the upward projection on the fifth wheel, and the lower side of this end rests upon the upper convex surface of the fifth wheel part E. A much larger bearing surface is thus provided at this point than would be if the connection depended on the bolt $C'$ alone.

The lower half D of the fifth wheel, at its center, projects rearwardly, as shown, so that the hole therein for the pivot bolt is to the rear of the axle. Its bearing surface, as shown most plainly in Figs. 3, 4 and 6 is a comparatively large circular convex plate with a ridge or rim $d$ extending around approximately half its periphery on the forward side. Centrally, it is provided with an upward projection $d'$ around which is a flange or collar $d^2$. Preferably, this projection and this collar are formed separately, and, as shown in Fig. 3 and 4, are attached together in a peculiar manner. The projection $d'$, as shown in said figures, has a shoulder upon which the collar is seated when in place. The upper half of said collar is reamed out somewhat, and as the central hole extends down through the projection, after said collar is put in position, it can be secured there by driving a tapering swage down into said hole, thus spreading it at the top, and forcing the metal of which it is composed against the inner sides of the reamed out portion of the collar, as shown in Fig. 4.

Said collar is thus held very securely in position and by a very simple and inexpensive operation.

The half E of the fifth wheel, as shown most plainly in Figs. 3, 4 and 7, has a comparatively large circular concave surface, corresponding to the convex surface of the part D, and has a groove $e$ around half its periphery on the forward side corresponding to the ridge $d$ on the half D. Its central hole is of a diameter equal to the outside diameter of the projection $d'$ on the part D, and surrounds said projection when the parts are assembled. Leading up to this hole from the rear side is a slit by means of which the parts are enabled to be put together, in the manner shown in Fig. 8. This slit is shown of somewhat less width than the diameter of the hole, and the projection $d$ is shown as having flattened sides, which permits this form of slit.

It will be seen by an inspection of the drawings that when the parts are assembled together and turned into the proper relation, (the act of assembling, as illustrated in Fig. 8, is accomplished while the parts are in the opposite position, relatively, to that which they finally occupy) they are securely locked, as the collar $d^2$ prevents the part E from rising away from the part D, and the ridge and groove $d$ and $e$ effectually prevent any lateral movement. The broad bearing or wearing surfaces admit of a comparatively light structure, at the same time securing great durability. The parts are of the simplest and plainest possible description, and there is nothing whatever to get out of order. The concave and convex formation of the bearing parts also secures that a great portion of the pulling friction shall be taken up by the large surfaces, which are held in contact by the superimposed weight, as one surface to the extent of its convexity enters up into the concave under side of the one above it, and so that the two could not be pulled apart without raising the load to that extent.

Having thus fully described my said invention, what I claim as new, and desire to secure by Letters Patent, is—

1. The combination, in a fifth wheel, of the parts D and E, one having a large convex surface, and the other a correspondingly large concave surface, and one being provided with a ridge, as $d$, extending around approximately one-half its periphery, and the other having a corresponding groove, as $e$, similarly positioned, substantially as shown and described.

2. The combination, in a fifth wheel, of the parts D and E provided with comparatively large bearing surfaces one having a ridge $b$ and the other having a corresponding groove $e$, extending partially around the outer edges of the bearing surfaces at the forward side substantially as shown and described.

3. The combination, in a fifth wheel, of the parts D and E, one having a projection, as $d'$, provided with a collar, through the center of which the attaching bolt passes, and the other having a central hole adapted to surround said projection when assembled, and a slit extending out to one side from said hole for use in assembling, substantially as set forth.

4. The combination of the axle, the bolster, the reach, and the fifth wheel, said fifth wheel being composed of the two parts D and E, said part E having a central opening, and said part D having an upwardly projecting shouldered part $d'$ extending through said hole, and a flange or collar $d^2$ secured thereon above said part E, substantially as shown and described.

5. The combination of the axle, the bolster, the reach, the two parts of a fifth wheel, one secured to the axle and the other to the bolster and both projecting to the rear thereof and provided with a hole for a connecting bolt, an axle plate A' secured to the under side of the axle and having a rearwardly projecting ear with a corresponding hole for the connecting bolt, and reach irons, one extending to above the fifth wheel and the other to below said axle plate, and a connecting bolt C' passing through said several parts, substantially as shown and described.

In witness whereof I have hereunto set my hand and seal, at Indianapolis, Indiana, this 19th day of August, A. D. 1892.

STEPHEN VAN SLYKE. [L. S.]

Witnesses:
CHESTER BRADFORD,
JAMES A. WALSH.